R. W. BECKMAN.
VEHICLE SPRING SUSPENSION.
APPLICATION FILED APR. 16, 1920.
1,373,940.
Patented Apr. 5, 1921.
3 SHEETS—SHEET 1.
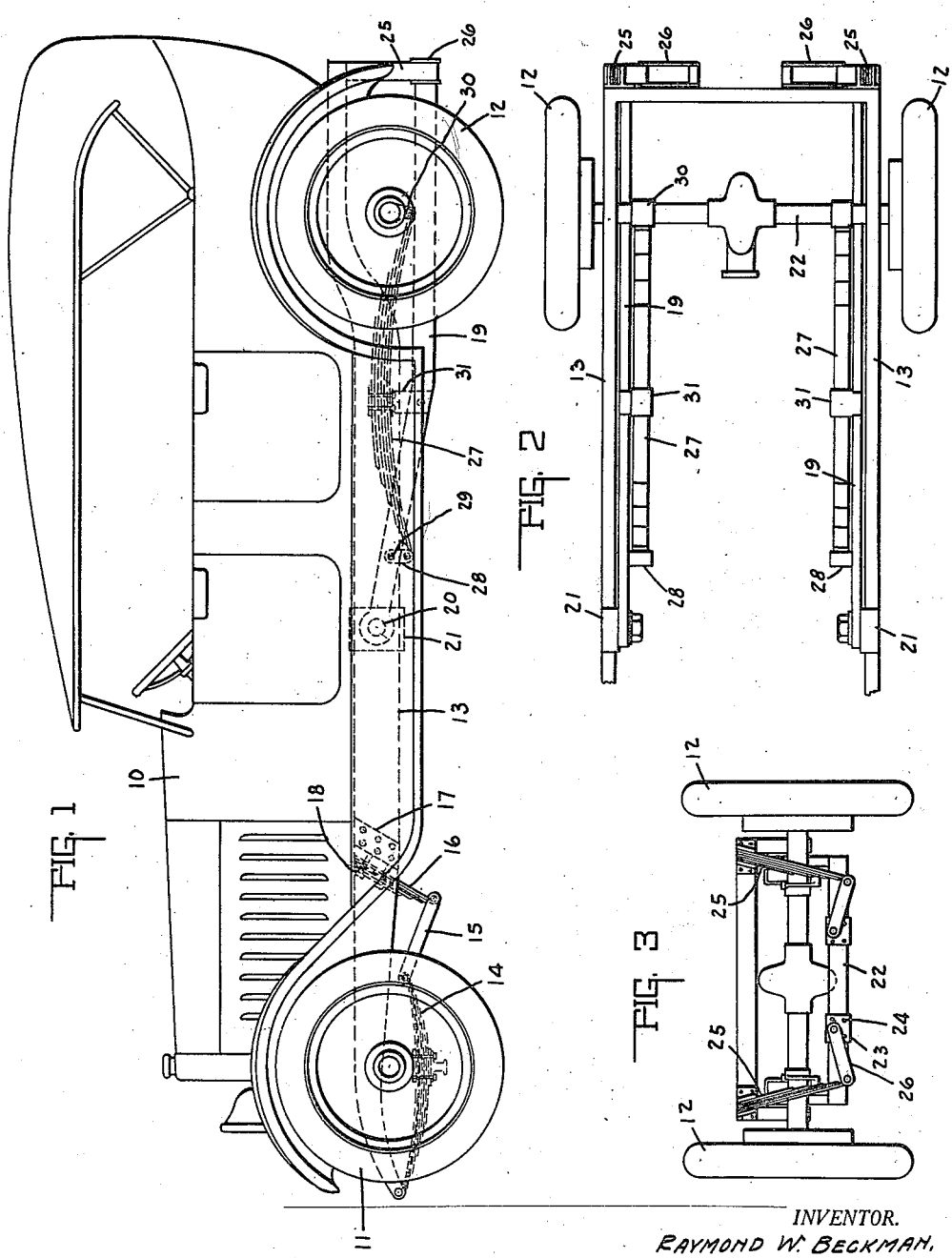
INVENTOR.
RAYMOND W. BECKMAN.
BY
Lockwood & Lockwood
ATTORNEYS.

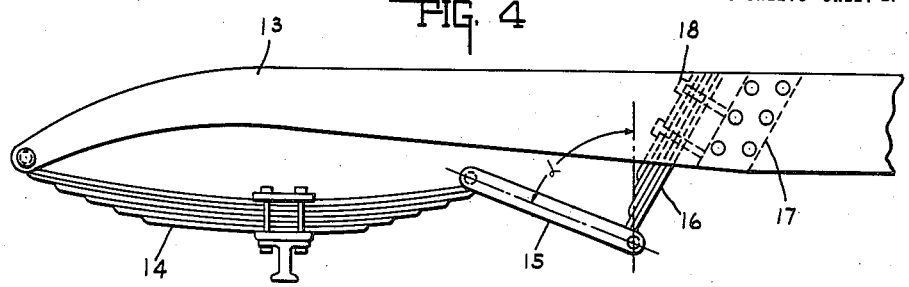
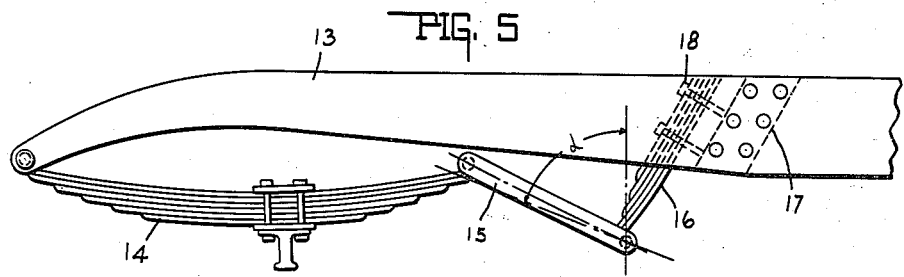
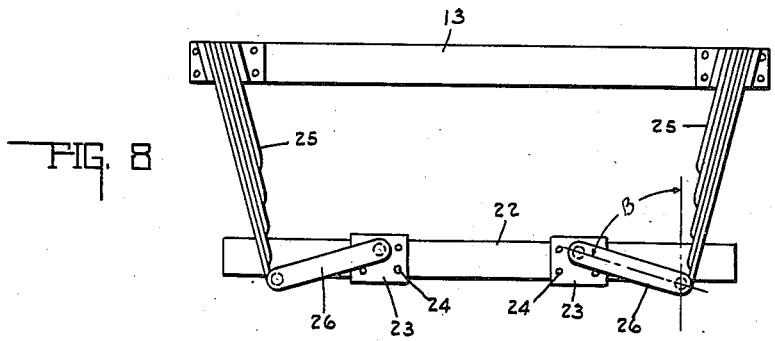
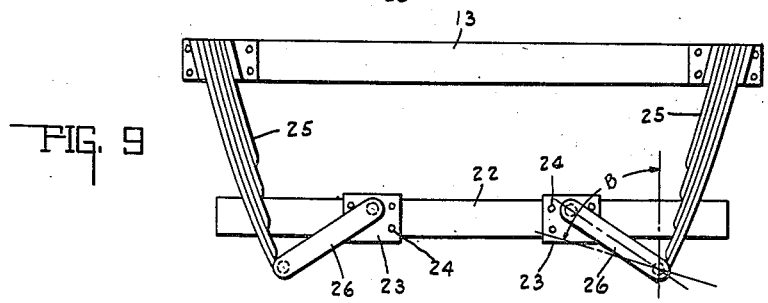

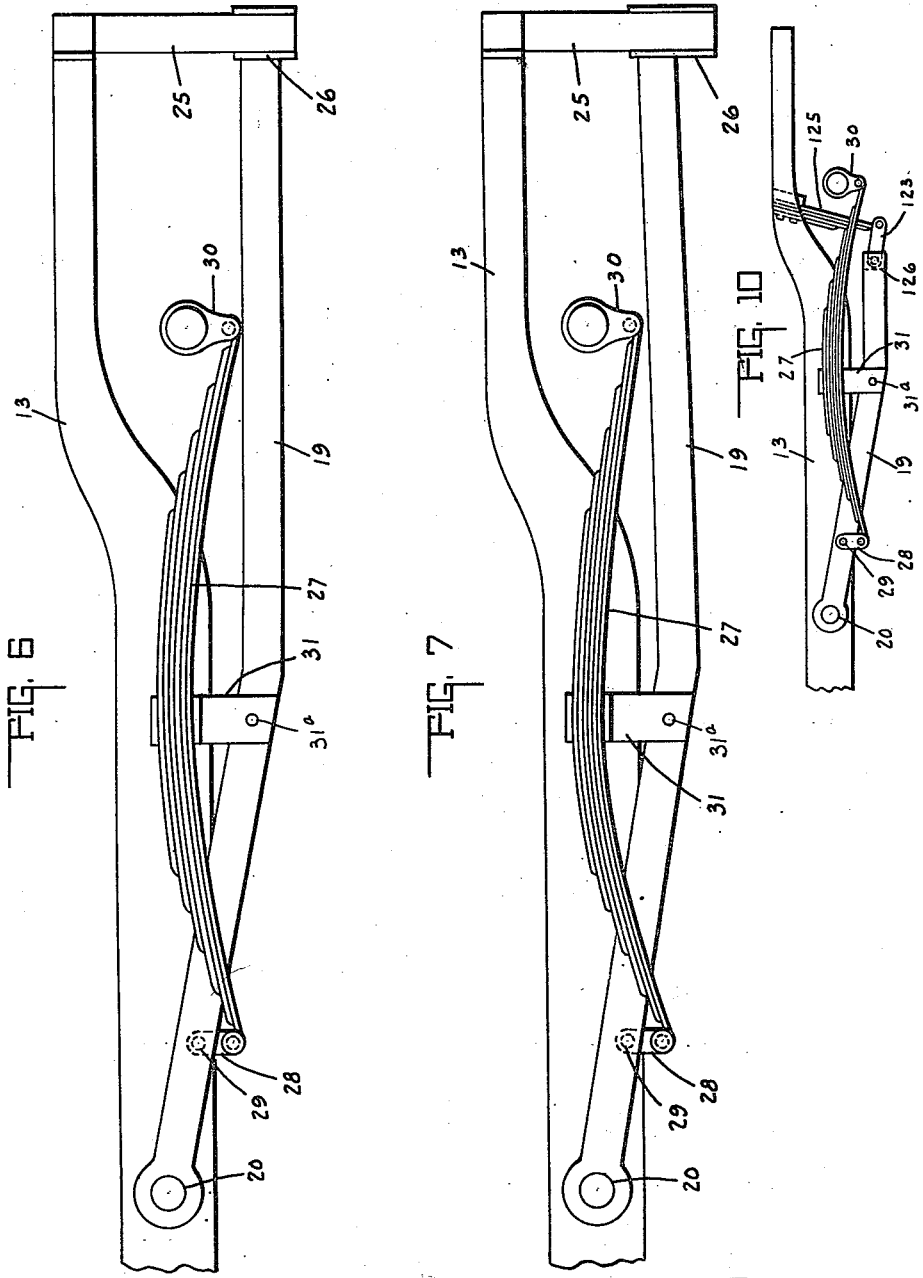

UNITED STATES PATENT OFFICE.

RAYMOND W. BECKMAN, OF INDIANAPOLIS, INDIANA.

VEHICLE SPRING SUSPENSION.

1,373,940.    Specification of Letters Patent.    Patented Apr. 5, 1921.

Application filed April 16, 1920. Serial No. 374,425.

*To all whom it may concern:*

Be it known that I, RAYMOND W. BECKMAN, a citizen of the United States, and a resident of Indianapolis, county of Marion, and State of Indiana, have invented a certain new and useful Vehicle Spring Suspension; and I do hereby declare that the following is a full, clear, and exact description thereof, reference being had to the accompanying drawings, in which like numerals refer to like parts.

This invention relates to improved spring suspension for automobiles and other vehicles, and the object of the invention is to provide a spring suspension construction that will more completely take up and absorb the vertical movements of the running gears of the vehicle by reason of the unevenness of the roadway in order that the same shall not be transmitted to the frame or body of the vehicle, and thus cause the vehicle to ride smoothly and without appreciable jarring or vertical movement and avoid discomforts to the occupants of the vehicle and injury to the automobile resulting therefrom.

The chief object of this invention is to transform the vertical movement of the axle or supporting frame into a horizontal movement and provide means for resisting and absorbing said horizontal movement, as well as yieldingly support the frame upon the axle in the usual manner.

One feature of the invention consists primarily in the use of leaf springs that are nearly vertical or at an acute angle to a vertical line as distinguished from the ordinary horizontally disposed leaf springs, and in combining therewith connecting bars pivoted at one end to the free ends of said angularly disposed springs and at the other end to some part of the vehicle having relatively vertical movement in relation to said substantially upright springs.

In carrying out the foregoing invention, one feature thereof consists in mounting said angularly disposed springs on the vehicle frame and pivoting a bar to the free end thereof, which at its other end is pivoted to some member whose vertical movement is controlled or influenced by the axle or other part having vertical movement independently of the frame. Thus, said angularly disposed spring may be connected by pivoted bars with the horizontal leaf spring or other means mounted on or in connection with the axle, so that the vertical movement of said horizontal spring or means will subject the angularly disposed spring to strain and be substantially resisted and influenced thereby. Or said connecting bar extending from the end of said substantially vertical spring may be connected with a sub-frame, the vertical movements of which are influenced by the axle or by a horizontal spring which is controlled by the axle.

The full nature of the invention will be understood from the accompanying drawings and the following description and claims.

In the drawings Figure 1 is a side elevational view of the invention as applied to a modern type of motor vehicle, such as a passenger automobile. Fig. 2 is a plan view of the invention when applied to the rear wheels and the rear portion of a motor vehicle chassis frame. Fig. 3 is an end elevational view of the parts shown in Fig. 2. Fig. 4 is a view of the invention when applied to the front wheels of a motor vehicle chassis frame and shows the parts in the normal position, as illustrated in Fig. 1. Fig. 5 is a view similar to Fig. 4 which shows said parts in one of the cushioning or shock absorbing positions. Fig. 6 is a side elevational view of the invention applied to the rear wheels and the motor vehicle chassis frame, and shows the parts in the normal position. Fig. 7 is a view similar to Fig. 6, but shows the parts in one of the cushioning or shock absorbing positions. Fig. 8 is a view similar to Fig. 3 and shows the same parts in the normal position. Fig. 9 is a view similar to Fig. 8 and shows the same parts in one of the shock absorbing or cushioning positions. Fig. 10 is a view similar to Fig. 6 and shows a modified form of the invention.

The present invention provides means for yieldingly supporting the chassis frame of a motor vehicle or the like upon the supporting wheels such that shocks received by said wheels or imparted to the same will be absorbed rather than be transmitted to the frame, and thence to the occupants or the power mechanism supported or conveyed thereby. In motor vehicles such as light trucks, passenger cars and the like where relatively high speeds are employed in transporting the occupants or the load, the wheels in spite of their usual pneumatic construction transmit considerable vertical movement of the shock imparted to said wheels to the yielding suspension and to the supporting frame. It has been common experience that in passing over a relatively smooth road, a continued succession of obstacles or depressions in said road will cause the wheels to bound and rebound, which motion or vibration is transmitted to the frame, occupants and load. The present invention when applied to the usual construction heretofore employed is of sufficient capacity to absorb all of said oscillations due to the bounding and rebounding of the vehicle wheels, and at the same time yieldingly support said vehicle upon said wheels.

The invention is clearly illustrated in Figs. 1, 2 and 3; Figs. 4 to 9 inclusive illustrating the normal load and operating position, as well as one of the shock absorbing or cushioning positions. In the drawings there is shown an automobile 10 provided with front wheels 11 and the rear wheels 12 yieldingly supporting the longitudinally extending channel members 13 forming the chassis frame; all of the foregoing being of the usual construction.

The front wheels 11 are yieldingly supported upon the frame 13 by means of a horizontal semi-elliptical spring 14, one end of which is suitably pivoted, shackled or otherwise secured to the forward end of the chassis frame in the usual or any preferred manner. The other end of said spring is pivotally secured to one end of a pair of parallel bar members 15, the other end thereof being pivotally secured to a cantaliver spring 16. The cantaliver spring 16 is angularly or nearly vertically positioned upon the frame 13 and suitably secured thereto in depending relation since an overslung frame is shown by means of a supporting bracket plate 17 and the securing bolt means 18. The weight supported by the front wheel is sustained by the cantaliver spring 16 and the forward end of the chassis frame. The front wheel 11 is secured to the spring 14 intermediate the ends thereof, as is customary in the usual construction.

As shown clearly in Figs. 1, 4 and 5, the vehicle when loaded settles lower upon the springs 14 such that the springs 14 tend to straighten or flatten out, and the ends of the bars 15 connected to the spring 14 tend to move rearwardly as well as downwardly in said flattening movement. The angularly and dependingly disposed spring 16 tends to resist the rearward movement of the bar 15 and also the downward movement thereof. The bars 15, therefore, and the spring 16, as shown clearly in Fig. 5, tend to move from the position shown in Fig. 4 to that shown in Fig. 5, such that the angle formed between said spring and said bars becomes more acute than when said parts are in the normal position. Fig. 5, it will be understood, however, illustrates one of the positions assumed by the parts when cushioning the shocks and does not illustrate the position assumed by said parts when the vehicle is loaded. The spring and bar means thus absorbs the shocks sustained by the wheel 11 and substantially eliminates the vibrations incident to road traveling.

The means here shown for similarly supporting the rearward portion of the vehicle upon the rear wheels comprises a sub-frame 19 formed substantially U-shaped and adapted to lie adjacent and within the two longitudinal channel members 13 forming the chassis frame. Said U-shaped sub-frame 19 is pivotally supported at the ends thereof by means of the pivot 20 and the pivot block 21 secured to the chassis frame 13. The transverse connecting portion 22 of the U-shaped sub-frame is adapted to receive a pair of pivot blocks 23, each block being secured thereto in any adjusted position by suitable means such as the bolts 24. Upon or adjacent each rear end of the longitudinally extending channels forming the frame 13 is rigidly secured a cantaliver spring member 25. The free end of each cantaliver spring 25 is pivotally supported by means of a pair of parallel bar members 26, said bar members 26 being suitably pivoted to the pivot block 23. Thus, the U-shaped sub-frame 19 is pivotally supported at 20 upon the chassis frame and the middle portion of the U-shaped frame is yieldingly supported by the ends of the chassis frame.

In Fig. 10 is illustrated a modified form of the sub-frame 19, wherein the same terminates short of the chassis 13 and is yieldingly supported thereby by the pivot 20 and the leaf spring 125, bar members 123 and pivot block 126.

The means for yieldingly supporting the rear wheels 12 upon the sub-frame 19 and the chassis frame 13 comprises a semi-elliptical spring 27, said spring having one end preferably supported upon the sub-frame member 19 by means of a shackle 28 and the pivot 29. The opposite end of said spring is suitably secured by means of the shackle 30 to the rear axle housing. The leaf spring 27 is supported intermediate its end by the pivoted fulcrum 31, said fulcrum being pivotally supported by the sub-frame 19 at 31ª.

Thus, when the rear wheel 12 moves upwardly after encountering an obstruction, the fulcrum 31 carried therewith also moves the U-shaped sub-frame 19 upwardly which forces the leaf spring 25 or its equivalent sidewardly and inwardly and the adjacent ends of the bar members 26 downwardly while the other ends of said bar members attached to the sub-frame are moved upwardly. The spring 25 and the bars 26 approach each other into a more acute position when said rear wheel 12 has been projected or forced upwardly in the manner described. Figs. 6 and 8 are respectively side and rear views of the rear wheel shock absorbing supporting means and show the same in the normal position. Figs. 7 and 9 are similar views showing said parts in one of the shock resisting positions.

It will be noted that the springs 18 and 25 are disposed angularly with respect to the chassis frame 13 and when resisting the bound of the wheel tend to move toward a vertical position when the free ends of said springs are connected to bar members within the adjacent octant, as shown. The other ends of said bar members are floatingly supported upon said frame, the wheels suitably supporting the vehicle by this floating connection. With this construction the intermittent or continuous bounding and rebounding of the car body while the same is being propelled is eliminated, so that the mechanism supported by the chassis frame, and the occupants of the car will be carried without being subjected to the vibration thereof.

The invention has been described in detail as applied to an overslung chassis frame with the angular shock absorbing spring positioned in the adjacent octant between said spring and said bar members and with a cantaliver leaf spring construction, it will be understood that the basic principle of the invention is transforming the vertical oscillations of the supporting wheels into substantially horizontal oscillations and providing means for resisting and absorbing said transformed oscillations. Many modifications, therefore, will suggest themselves to those skilled in the art, but the same are included within the broad purview of this invention.

The invention claimed is:

1. A spring suspension for vehicles having a frame and an axle, including a spring connected with one of said members and extending at an acute angle to a vertical line, and a bar pivoted at one end to the other one of said vehicle members and at the other end to the end of said spring.

2. A spring suspension for vehicles having a frame and an axle, including a spring secured to the frame and extending at an acute angle to a vertical line, a bar pivoted at one end to the end of said spring, and means influenced by the vertical movement of the axle to which the other end of said bar is pivoted.

3. A spring suspension for vehicles having a frame and an axle, including a spring secured to the frame and extending at an acute angle to a vertical line, a bar pivoted at one end to the end of said spring, and means connected with said axle to which the other end of said bar is pivoted.

4. A spring suspension for vehicles having a frame and an axle, including a spring secured to the frame and extending at an acute angle to a vertical line, a bar pivoted at one end to the end of said spring, and spring controlled means influenced by the vertical movement of the axle and to which the other end of said bar is pivoted.

5. A spring suspension for vehicles having a frame and an axle, including a spring secured to the frame and extending at an acute angle to a vertical line, a bar pivoted at one end to the end of said spring, and a spring connected with the axle to which the other end of said bar is pivoted.

6. A spring suspension for vehicles having a frame and an axle, including a spring secured to the frame and extending at an acute angle to a vertical line, a bar pivoted at one end to the end of said spring, and a substantially horizontal leaf spring connected with the axle to the end of which the other end of said bar is pivoted.

7. A spring suspension for vehicles having a frame and an axle, including a leaf spring connected at one end with one of said members and extending at an acute angle to a vertical line, a bar pivoted at one end to the free end of said spring, and pivotally connected at its other end with the other one of said vehicle members.

8. A spring suspension for vehicles having a frame and an axle, including a leaf spring secured at one end to the frame and extending at an acute angle to a vertical line, a bar pivoted at one end to the end of said spring, and means influenced by the vertical movement of the axle to which the other end of said bar is pivoted.

9. A spring suspension for vehicles having a frame and an axle, including a leaf spring secured at one end to the frame and extending at an acute angle to a vertical line, a bar pivoted at one end to the end of said spring, an auxiliary frame movable vertically and independently of said main frame and to which the other end of said bar is pivoted, and means controlled by the vertical movement of the axle for causing a corresponding movement of said auxiliary frame.

10. A spring suspension for vehicles having a frame and an axle, including a leaf spring secured at one end to the frame and extending at an acute angle to a vertical line, a bar pivoted at one end to the end of said spring, an auxiliary frame movable vertically and independently of said main frame and to which the other end of said bar is pivoted, and yielding means controlled by the vertical movement of the axle for causing corresponding movement of the auxiliary frame.

11. A spring suspension for vehicles having a main frame and an axle, including an auxiliary frame with one end pivoted to the side of the main frame and the other end extending adjacent the main frame and the axle, yielding means controlled by the vertical movement of the axle for influencing the vertical movement of the auxiliary frame, a leaf spring secured at the upper end to the main frame and extending toward the auxiliary frame and at an acute angle to a vertical line, and a connecting bar pivoted to the free end of said spring and to said auxiliary frame.

12. A spring suspension for vehicles having a main frame and an axle, including an auxiliary frame with one end pivoted to the side of the main frame and the other end extending adjacent the main frame and rearwardly thereof, a leaf spring pivotally connected at one end to the axle and at the other end to the auxiliary frame and pivotally fulcrumed intermediate its end upon the auxiliary frame, and a connecting bar pivoted to the free end of said spring and to said auxiliary frame.

13. In a vehicle the combination with a body supporting frame, and a pair of supporting wheels adjacent thereto, of a U-shaped sub-frame, the free ends thereof being pivoted to said body frame, intermediate the ends and extending rearwardly thereof, said sub-frame being yieldingly supported by said body frame member, said yielding means including a pair of spring members secured at one end to the frame, bar means connecting the free ends of each of said spring members to said sub-frame, and means associating said frame and sub-frame with said wheels.

In witness whereof, I have hereunto affixed my signature.

RAYMOND W. BECKMAN.